US012581548B2

(12) United States Patent
Shafin et al.

(10) Patent No.: US 12,581,548 B2
(45) Date of Patent: Mar. 17, 2026

(54) TDLS DISCOVERY PROCESS FOR EMLSR OPERATION

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 18/343,647

(22) Filed: Jun. 28, 2023

(65) Prior Publication Data

US 2024/0015812 A1      Jan. 11, 2024

Related U.S. Application Data

(60) Provisional application No. 63/359,148, filed on Jul. 7, 2022.

(51) Int. Cl.
H04W 76/10      (2018.01)
H04W 8/00      (2009.01)
(Continued)

(52) U.S. Cl.
CPC ........... H04W 76/10 (2018.02); H04W 8/005 (2013.01); H04W 74/0816 (2013.01)

(58) Field of Classification Search
CPC ..... H04W 76/10; H04W 76/14; H04W 76/15; H04W 8/005; H04W 74/0816; H04W 84/12

(Continued)

(56) References Cited

U.S. PATENT DOCUMENTS

2021/0377856 A1      12/2021      Chu et al.
2022/0029736 A1      1/2022      Chu et al.
(Continued)

FOREIGN PATENT DOCUMENTS

CN      114125992 A      3/2022
EP      4199598 A1      6/2023
(Continued)

OTHER PUBLICATIONS

IEEE P802.11be-D3.0 "Part 11: Wireless LAN Medium Access Control (MAC) and Physical Layer (PHY) Specifications— Amendment 8: Enhancements for extremely high throughput (EHT)" Jan. 2023, 999 pages.

(Continued)

*Primary Examiner* — Candal Elpenord

(57)      ABSTRACT

Methods and apparatuses for tunneled direct link setup (TDLS) discovery for enhanced multi-link single radio (EMLSR) operation are disclosed. A method for wireless communication performed by a non-access point (AP) multi-link device (MLD) that comprises stations (STAs), the method comprising: forming links with corresponding APs of an AP MLD, wherein at least a subset of the links are enhanced multi-link single-radio (EMLSR) links configured to operate in an EMLSR mode of operation; generating a first message including a TDLS discovery request on the links separately for discovery of a peer STA on a corresponding link on which the TDLS discovery request is sent; transmitting, to the AP MLD, the first message, and receiving a message containing a TDLS discovery response message indicating discovery of the peer STA on the link on which the TDLS discovery request was sent.

12 Claims, 16 Drawing Sheets

(51) Int. Cl.
    *H04W 74/08*          (2024.01)
    *H04W 74/0816*        (2024.01)

(58) Field of Classification Search
    USPC ........................................................ 370/254
    See application file for complete search history.

(56)                     References Cited

U.S. PATENT DOCUMENTS

| | | | |
|---|---|---|---|
| 2022/0110053 A1 | 4/2022 | Chu et al. | |
| 2022/0124857 A1 | 4/2022 | Patil et al. | |
| 2023/0155784 A1* | 5/2023 | Chang ................... | H04W 76/15 |
| | | | 370/329 |
| 2023/0180323 A1 | 6/2023 | Sang et al. | |
| 2024/0334509 A1* | 10/2024 | Hwang ................ | H04W 74/08 |
| 2024/0389149 A1* | 11/2024 | Kim ................... | H04W 28/0278 |
| 2024/0407031 A1* | 12/2024 | Lin ....................... | H04L 5/0053 |
| 2025/0016860 A1* | 1/2025 | Lorgeoux ............. | H04W 76/34 |
| 2025/0056614 A1* | 2/2025 | Quan ..................... | H04W 8/22 |
| 2025/0133591 A1* | 4/2025 | Dong .................... | H04W 28/02 |
| 2025/0287308 A1* | 9/2025 | Mehrnoush .......... | H04W 76/27 |

FOREIGN PATENT DOCUMENTS

| | | |
|---|---|---|
| WO | 2014152853 A2 | 9/2014 |
| WO | 2022017173 A1 | 1/2022 |
| WO | 2022086952 A1 | 4/2022 |
| WO | 2022124979 A1 | 6/2022 |

OTHER PUBLICATIONS

IEEE P802.11-REVme™/D2.1 "Part 11: Wireless LAN Medium Access Control (MAC) and Physical Layer (PHY) Specifications," Jan. 2023, 5803 pages.

International Search Report and Written Opinion issued Oct. 16, 2023 regarding International Application No. PCT/KR2023/ 009489, 7 pages.

Extended European Search Report issued Mar. 28, 2025 regarding Application No. 23835824.6, 10 pages.

* cited by examiner

1500

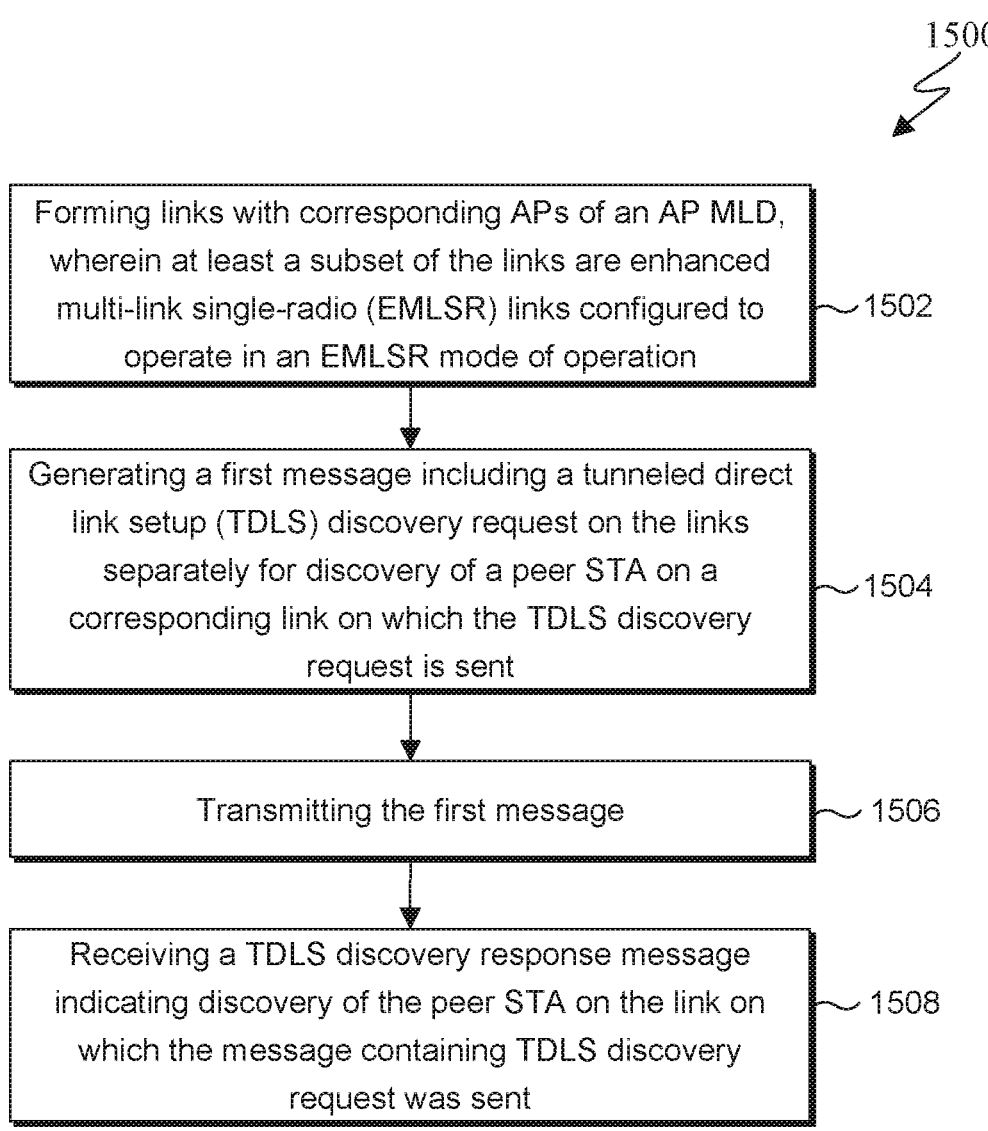

Forming links with corresponding APs of an AP MLD, wherein at least a subset of the links are enhanced multi-link single-radio (EMLSR) links configured to operate in an EMLSR mode of operation ~1502

Generating a first message including a tunneled direct link setup (TDLS) discovery request on the links separately for discovery of a peer STA on a corresponding link on which the TDLS discovery request is sent ~1504

Transmitting the first message ~1506

Receiving a TDLS discovery response message indicating discovery of the peer STA on the link on which the message containing TDLS discovery request was sent ~1508

FIG. 15

TDLS DISCOVERY PROCESS FOR EMLSR OPERATION

CROSS-REFERENCE TO RELATED APPLICATION AND CLAIM OF PRIORITY

This application claims priority under 35 U.S.C. § 119(e) to U.S. Provisional Patent Application No. 63/359,148 filed on Jul. 7, 2022, which is hereby incorporated by reference in its entirety.

TECHNICAL FIELD

This disclosure relates generally to transmission efficiency in wireless communications systems that include multi-link devices. Embodiments of this disclosure relate to methods and apparatuses for tunneled direct link setup (TDLS) discovery for enhanced multi-link single radio (EMLSR) operation.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for TDLS discovery for enhanced multi-link single radio (EMLSR) operation.

In one embodiment, a non-AP MLD is provided, comprising: stations (STAs), each comprising a transceiver configured to form a link with a corresponding AP of an AP MLD, wherein at least a subset of the links are EMLSR links configured to operate in an EMLSR mode of operation. The non-AP MLD further comprises a processor operably coupled to the STAs, the processor configured to generate a first message including a tunneled direct link setup (TDLS) discovery request on the links separately for discovery of a peer STA on the corresponding link on which the message containing the TDLS discovery request is sent. At least one of the transceivers is configured to: transmit, to the AP MLD, the first message, and receive a TDLS discovery response message indicating discovery of the peer STA on the link on which the message containing the TDLS discovery request was sent.

In another embodiment, an AP MLD is provided, comprising: APs, each comprising a transceiver configured to form a link with a corresponding STA of a non-AP MLD, wherein at least a subset of the links are EMLSR links configured to operate in EMLSR mode of operation, wherein at least one of the transceivers is configured to: receive, from the STA, a first message including a TDLS discovery request on the links separately for discovery of a peer STA on the corresponding link on which the TDLS discovery request is sent, and transmit an EMLSR control message to another link to facilitate the non-AP MLD sending the TDLS discovery request on the another link. The AP MLD further comprises a processor operably coupled to the APs, the processor configured to: generate the EMLSR control message based on the TDLS discovery request.

In yet another embodiment, a method for wireless communication performed by a non-AP MLD that comprises STAs, the method comprising: forming links with corresponding APs of an AP MLD, wherein at least a subset of the links are EMLSR links configured to operate in EMLSR mode of operation; generating a first message including a TDLS discovery request on the links separately for discovery of a peer STA on the corresponding link on which the message containing the TDLS discovery request is sent; transmitting, to the AP MLD, the first message, and receiving a message containing TDLS discovery response message indicating discovery of the peer STA on the link on which the TDLS discovery request was sent.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15 illustrates a flowchart of a method for wireless communication performed by a non-AP device according to embodiments of the present disclosure.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: IEEE P802.11be/D2.0 "Part 11: Wireless LAN Medium Access Control (MAC) and Physical Layer (PHY) Specifications—Amendment 8: Enhancements for extremely high throughput (EHT)".

Embodiments of the present disclosure provide mechanisms for TDLS discovery for EMLSR operation.

Figure 1:
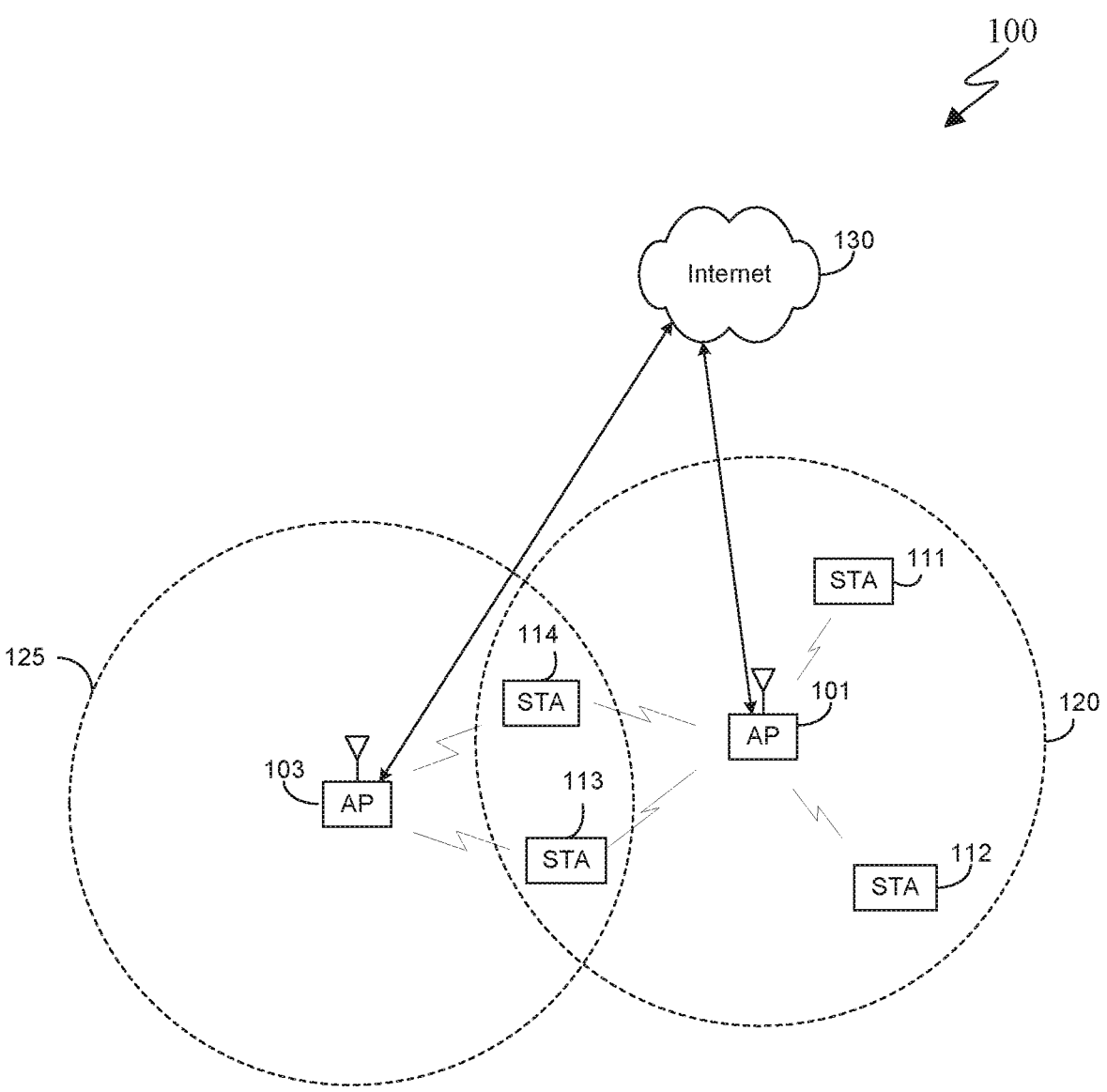
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal,"

or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for traffic urgency indication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
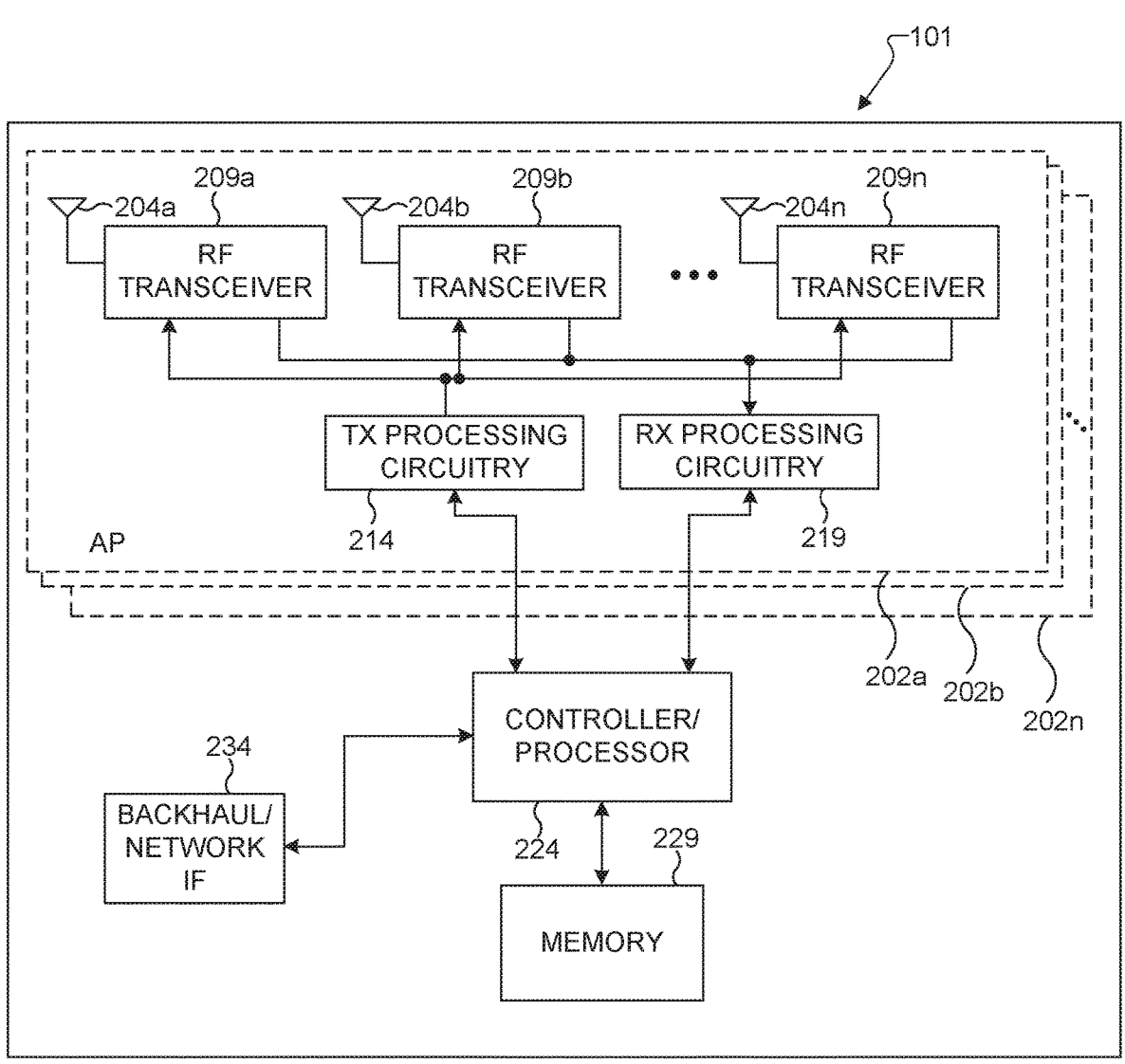
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including traffic urgency indication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for traffic urgency indication. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
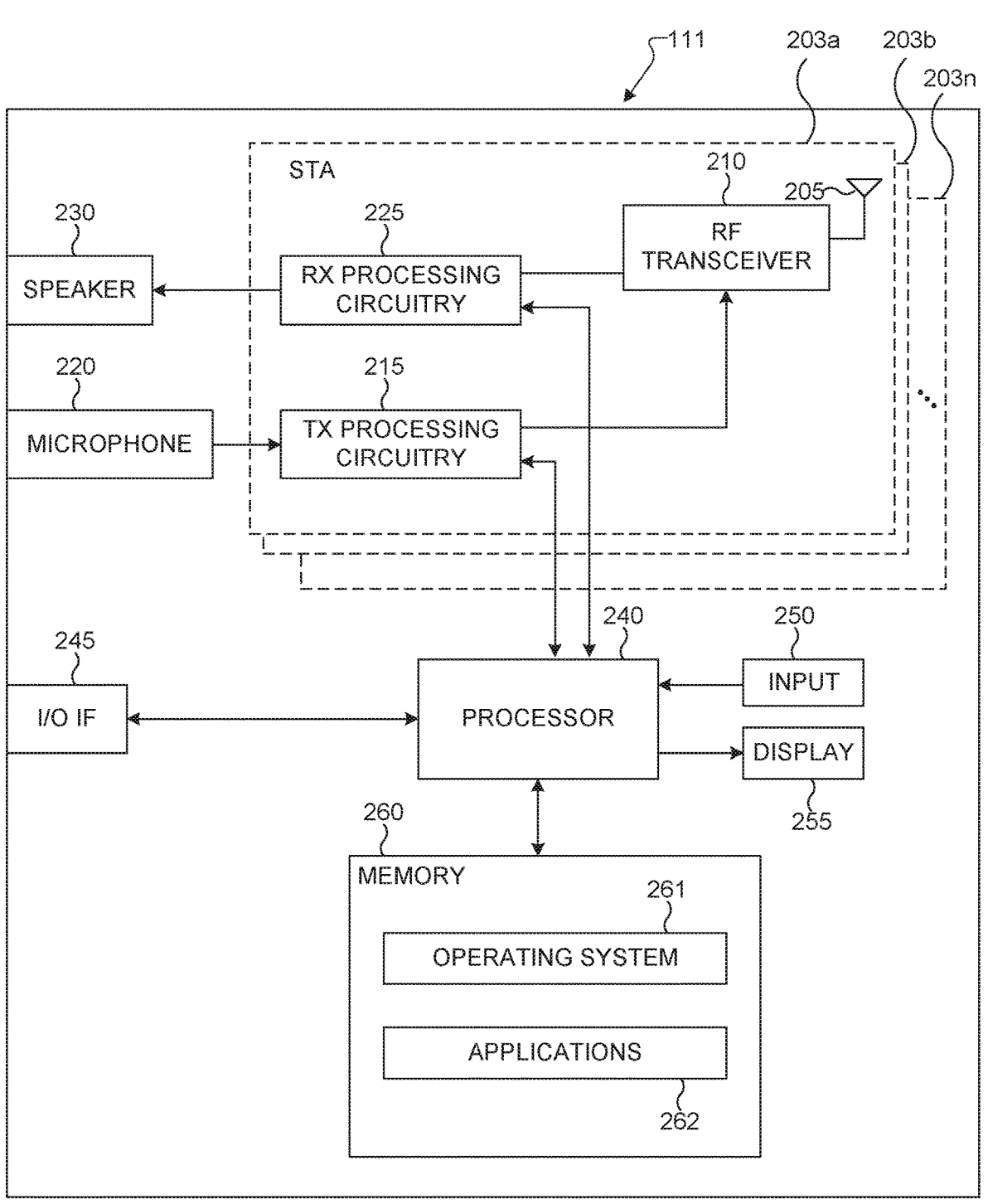
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support traffic urgency indication. In some embodiments, the controller/processor 240 includes at least one microprocessor or microcontroller.

The controller/processor 240 is also capable of executing other processes and programs resident in the memory 260, such as operations for supporting traffic urgency indication. The controller/processor 240 can move data into or out of the memory 260 as required by an executing process. In some embodiments, the controller/processor 240 is configured to execute a plurality of applications 262, such as applications for supporting traffic urgency indication. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs).

Also, while FIG. 2B illustrates the non-AP MLD 111 configured as a mobile telephone or smartphone, non-AP MLDs can be configured to operate as other types of mobile or stationary devices.

Various embodiments of the present disclosure recognize that in the single TDLS link discovery/setup process, when the MLD in the EMLSR mode (or a single radio non-AP MLD) is the TDLS initiator and a TDLS responding device is a legacy device, the TDLS discovery response can be sent over a link but the EMLSR device may not be operating on that link when the response frame is sent by the TDLS responder (EMLSR device at that time may have the radio on another link).

Accordingly, various embodiments of the present disclosure provide mechanisms such that when a non-AP MLD intends to discover a TDLS peer STA on any of its links and if the non-AP MLD is operating in EMLSR mode, then the non-AP MLD may send the TDLS Discovery Request frames on different links separately—each TDLS Discovery Request frame can be for discovering TDLS peer STAs on which the TDLS Discovery Request frame is sent.

The procedure for discovery and setup of single link TDLS direct link between two non-AP MLDs is defined in the 802.11be specification. The discovery process for discovering a single TDLS peer STA is illustrated in FIG. 3 and FIG. 4.

Figure 3:
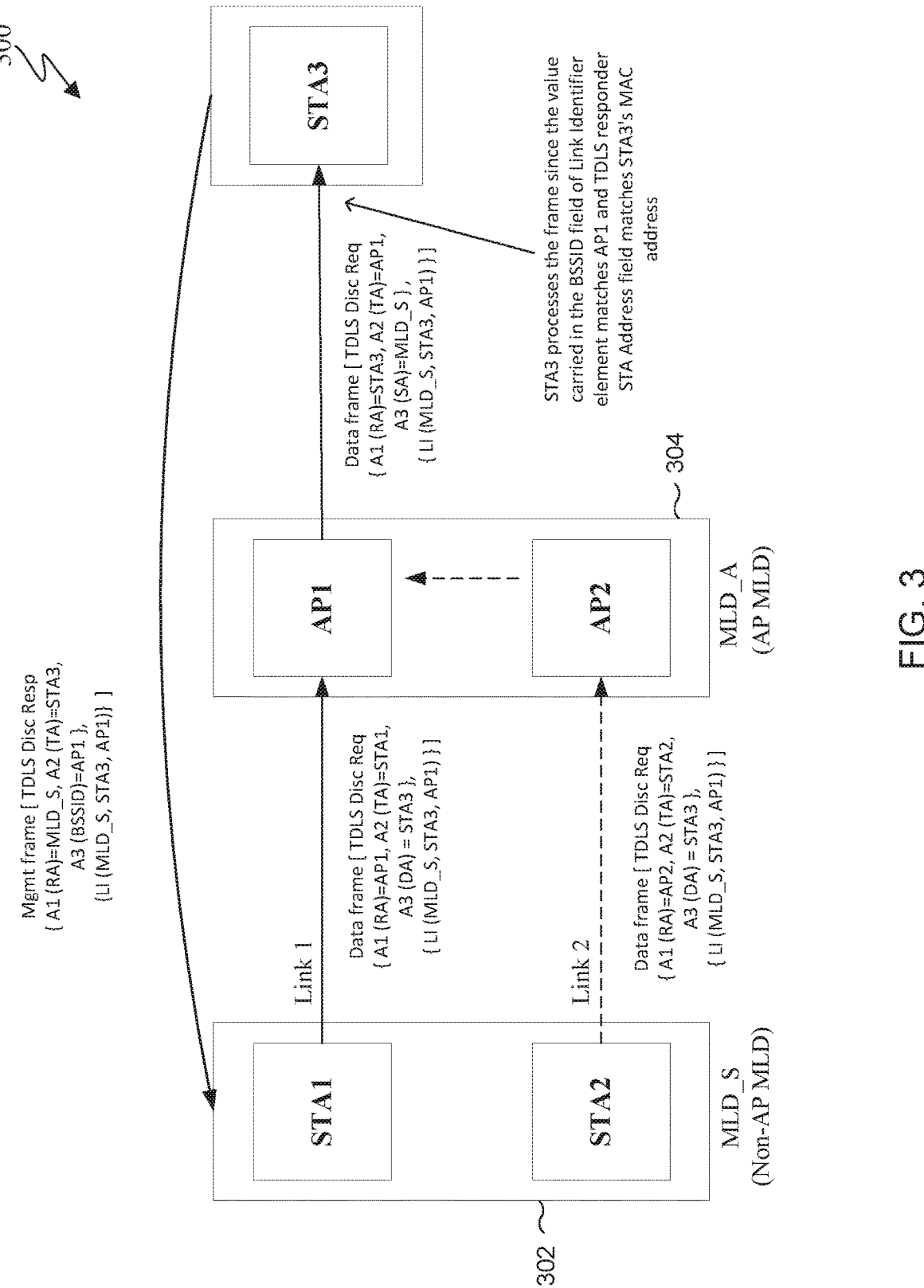
FIG. 3 illustrates an example of a discovery process for discovering a single link TDLS according to embodiments of this disclosure.

FIG. 3 illustrates an example of a discovery process 300 for discovering a single link tunneled direct link setup (TDLS) according to embodiments of this disclosure. The embodiment of the example discovery process 300 shown in FIG. 3 is for illustration only. Other embodiments of the example discovery process 300 could be used without departing from the scope of this disclosure.

Figure 4:
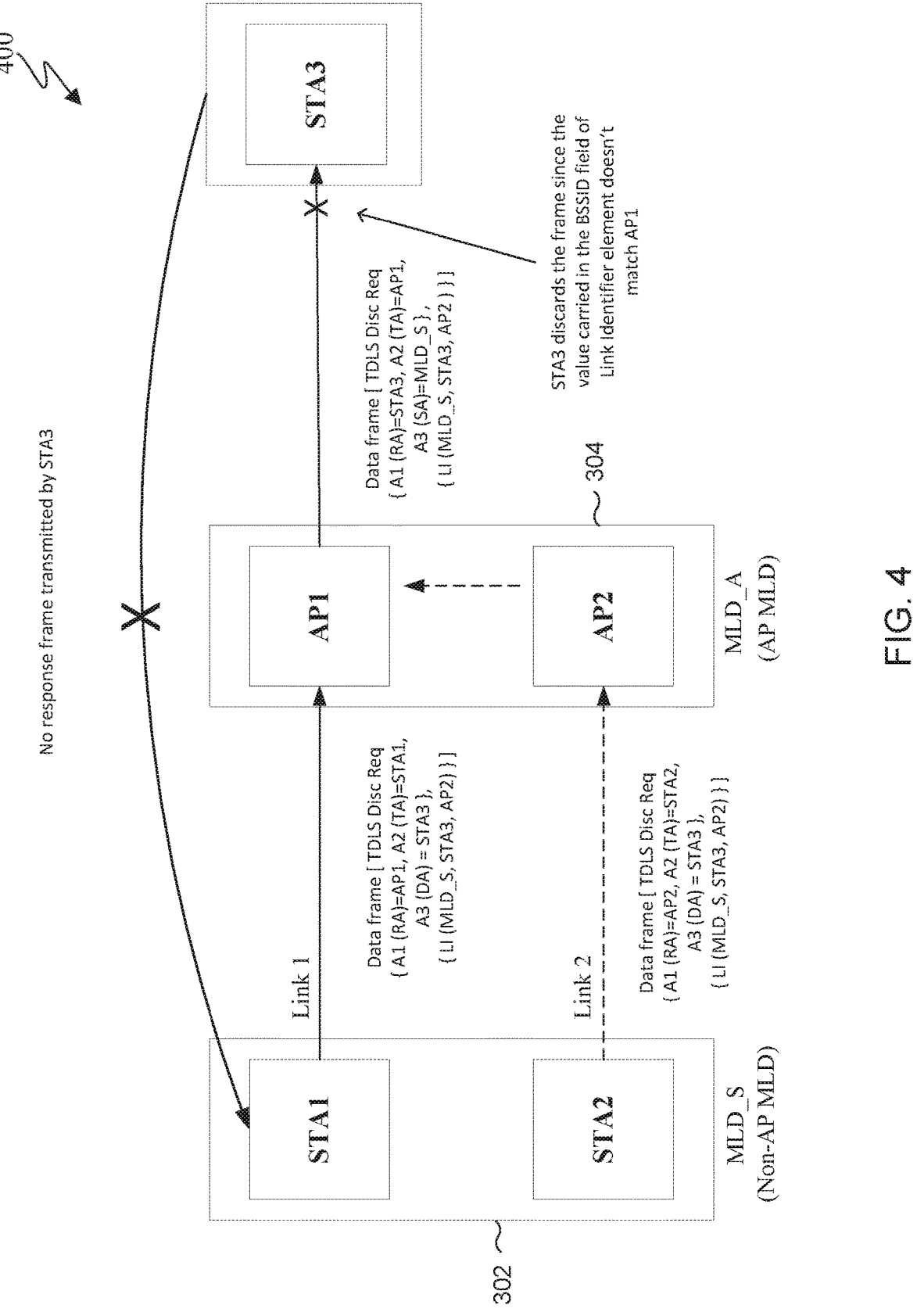
FIG. 4 illustrates another example of a discovery process for discovering a TDLS according to embodiments of this disclosure.

FIG. 4 illustrates another example of a discovery process 400 for discovering a TDLS according to embodiments of this disclosure. The embodiment of the example discovery process 400 shown in FIG. 4 is for illustration only. Other embodiments of the example discovery process 400 could be used without departing from the scope of this disclosure.

As illustrated in FIGS. 3 and 4, the TDLS discovery is initiated by a non-AP MLD (MLD_S) 302. The MLD_S 302 has performed multi-link setup with an AP MLD (MLD_A) 304. The MLD_S 302 has two affiliated STAs, STA1 and STA2. STA3 is not capable of performing multi-link operation and is not affiliated with a non-AP MLD. The MLD_A 304 has two affiliated APs, AP1 and AP2, where AP1 operates on link 1 and AP2 operates on link 2. STA1 and STA3 operate on link 1 and are associated with AP1. STA2 operates on link 2 and is associated with AP2. In the example, the MLD_S 302 initiates TDLS discovery by transmitting two TDLS Discovery Request frames (which are Data frames) as it does not know which link STA3 is operating on and whether STA3 is an MLD, or a STA not affiliated with an MLD. The first TDLS Discovery Request frame has the BSSID field in the Link Identifier element set to the BSSID of AP1 and the second TDLS Discovery Request frame has this field set to the BSSID of AP2. Both the frames have their A3 (DA) set to the STA3 MAC address and the To DS subfield of the Frame Control field set to 1. The TDLS Discovery Request frame can be transmitted over either link 1 (through STA1 as represented by solid line) or link 2 (through STA2 as represented by dotted line). When the TDLS Discovery Request frame is received at the AP MLD 304 (i.e., through AP1 or AP2), it routes the frame to STA3, through AP1 by setting the From DS subfield of the Frame Control field to 1 and A3 (SA) to the non-AP MLD Address (i.e., MLD_S). STA3 discards the TDLS Discovery Request frame that had the BSSID field of Link Identifier element set to BSSID of AP2 as it does not recognize the BSSID. STA3 recognizes the BSSID set to AP1 and responds with a TDLS Discovery Response frame, which is a Management frame, with the RA set to the MLD_S and both To DS and From DS subfields set to 0. STA3 ignores the TDLS Multi-Link element as it does not recognize this element. The TDLS STA affiliated with the MLD_S 302 receives the TDLS Discovery Response frame, which is sent on the TDLS direct link. The TDLS initiator STA Address field and the TDLS responder STA Address field contained in the Link Identifier element (denoted as LI in the figure) are carried in the TDLS Discovery Request frame and in the TDLS Discovery Response frame and are set to MLD_S and STA3, respectively.

The non-AP MLDs in 802.11be can have different capabilities in terms of multi-link operation. The current specification defines two special kinds of multi-link operations, namely, Enhanced Multi-Link Single-Radio Operation (EMLSR) and Enhanced Multi-Link Multi-Radio Operation (EMLMR).

Many 802.11be non-AP MLDs may only have a single radio. EMLSR enables a multi-link operation with a single radio. With EMLSR operation, a non-AP MLD can achieve throughput enhancement with reduced latency—a performance close to concurrent dual radio non-AP MLDs. EMLSR operation and the behavior of STAs affiliated with non-AP MLD during EMLSR mode of operation are defined in 802.11be standards. According to current specifications, if a non-AP MLD intends to operate in EMLSR mode with its associated AP MLD, an STA affiliated with the non-AP MLD sends an EML Operating Mode Notification frame to its associated AP affiliated with the AP MLD, where the EMLSR Mode subfield in the EML Control field in the EML Operating Mode Notification frame is set to 1. Upon receiving the EML Operating Mode Notification frame from the non-AP MLD, the AP MLD can send, on any enabled link between the AP MLD and the non-AP MLD, another EML Operating Mode Notification frame, where the EMLSR Mode subfield in the EML Control field in the EML Operating Mode Notification frame is set to 1. The AP affiliated with the AP MLD is expected to send the EML Operating Mode Notification frame in response to the EML Operating Mode Notification frame sent by an STA affiliated with the non-AP MLD within the timeout interval indicated in the Transition Timeout subfield in EML Capabilities subfield in the Basic Variant Multi-Link element that is most recently exchanged between the AP MLD and the non-AP MLD. The non-AP MLD transitions to the EMLSR mode immediately after receiving the EML Operating Mode Notification frame with the EMLSR Mode subfield in the EML Control field set to 1 from an AP affiliated with the AP MLD or immediately after the timeout interval indicated in the Transition Timeout subfield in EML Capabilities field in the Basic Variant Multi-Link element elapses after the end of last PPDU contained in the EML Operating Mode Notification frame transmitted by the non-AP MLD, whichever occurs first. Upon transitioning into the EMLSR mode of operation, all STAs affiliated with the non-AP MLD transition to active mode (listening mode). This process for transitioning into the EMLSR mode using EML Operating Mode Notification frame exchanges is illustrated in FIG. 5.

Figure 5:
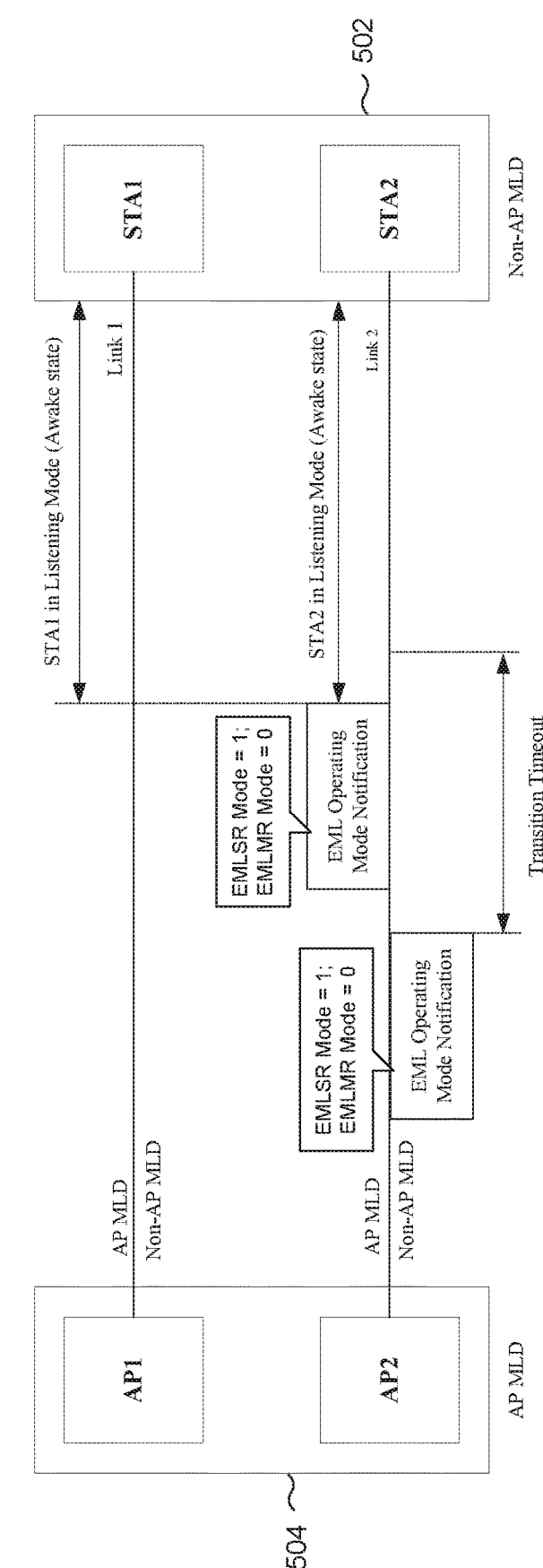
FIG. 5 illustrates an example of the use of enhanced multi-link (EML) operating mode notification frame to transition into EMLSR mode according to embodiments of this disclosure.

FIG. 5 illustrates an example 500 of the use of an enhanced multi-link (EML) operating mode notification frame to transition into EMLSR mode according to embodiments of this disclosure. The embodiment of the example 500 of the use of an enhanced multi-link (EML) operating mode notification frame to transition into EMLSR mode shown in FIG. 5 is for illustration only. Other embodiments of the example 500 of the use of an enhanced multi-link (EML) operating mode notification frame to transition into EMLSR mode could be used without departing from the scope of this disclosure.

As illustrated in FIG. 5, AP1 and AP2 are two APs affiliated with the AP MLD 504. Also, STA1 and STA2 are two non-AP STAs affiliated with the non-AP MLD 502. Two links are set up between the AP MLD 504 and the non-AP MLD 502—Link 1 between AP1 and STA1, and Link 2 between AP2 and STA2. Moreover, in this illustration, both Link 1 and Link 2 are enabled links. The non-AP MLD 504 intends to transition to the EMLSR mode, and accordingly, STA2 sends to AP2 over Link 2 an EML Operating Mode Notification frame with the EMLSR Mode subfield in the EML Control field set to 1. In response to the EML Operating Mode Notification frame transmitted by the non-AP MLD 504, AP2 sends to STA2 another EML Operating Mode Notification frame with the EMLSR Mode subfield in the EML Control field set to 1. After receiving the EML Operating Mode Notification frame from the AP MLD 502, the non-AP MLD 504 transitions into the EMLSR mode, and both STA1 and STA2 transition into listening mode.

Enhanced Multi-Link Multi-Radio (EMLMR) operation is another mode of operation newly defined in the IEEE 802.11be specification. With the EMLMR mode of operation, it is possible for a multi-link device with multiple radios to move transmit (TX)/receive (RX) chains from one link (for example, the first link) to another link (for example, the second link) of the same MLD, essentially increasing the spatial stream capability of the second link.

According to the current 802.11be specification, the procedure for a non-AP MLD's transitioning into EMLMR mode is quite similar to the procedure for transitioning into the EMLSR mode. According to the current 802.11be specification, if a non-AP MLD intends to operate in the EMLMR mode with its associated AP MLD, an STA affiliated with the non-AP MLD sends an EML Operating Mode Notification frame to its associated AP affiliated with the AP MLD, where the EMLMR Mode subfield in the EML Control field in the EML Operating Mode Notification frame is set to 1 (and the EMLSR Mode in the same frame is set to 0). Upon receiving the EML Operating Mode Notification frame from the non-AP MLD, the AP MLD can send, on any enabled link between the AP MLD and the non-AP MLD, another EML Operating Mode Notification frame, where the EMLMR Mode subfield in the EML Control field in the EML Operating Mode Notification frame is set to 1. The AP affiliated with the AP MLD is expected to send the EML Operating Mode Notification frame in response to the EML Operating Mode Notification frame sent by an STA affiliated with the non-AP MLD within the timeout interval indicated in the Transition Timeout subfield in the EML Capabilities subfield in the Basic Variant Multi-Link element that is most recently exchanged between the AP MLD and the non-AP MLD. The non-AP MLD transitions to the EMLMR mode immediately after receiving the EML Operating Mode Notification frame with the EMLMR Mode subfield in the EML Control field set to 1 from an AP affiliated with the AP MLD or immediately after the timeout interval indicated in the Transition Timeout subfield in the EML Capabilities field in the Basic Variant Multi-Link element elapses after the end of last PPDU contained in the EML Operating Mode Notification frame transmitted by the non-AP MLD, whichever occurs first. The following are some of the steps for operating in the EMLMR mode:

After the non-AP MLD transitions into EMLMR mode, it is the AP MLD that sends the Initial Frame to the non-AP MLD. The subsequent EMLMR frame exchanges occur on the link on which the AP MLD sends the Initial Frame.

According to current specification, initial frame can be any frame that is sent by the AP MLD to the non-AP MLD as the first frame after the non-AP MLD transitions into EMLMR mode.

According to current specification, the AP MLD, for EMLMR frame exchanges, shall select one of the links that are included as the EMLMR links.

After the AP MLD sends the initial frame on a link, the non-AP MLD is able to operate on that link with maximum spatial stream as indicated by the values in the EMLMR Rx NSS and EMLMR Tx NSS subfields in the EML Capabilities subfield of the Common Info field of the Basic Multi-Link element.

Immediately after the EMLMR frame exchange sequence is complete, the STAs affiliated with the AP MLD go back to operate with the per-link spatial stream capability.

Figure 6:
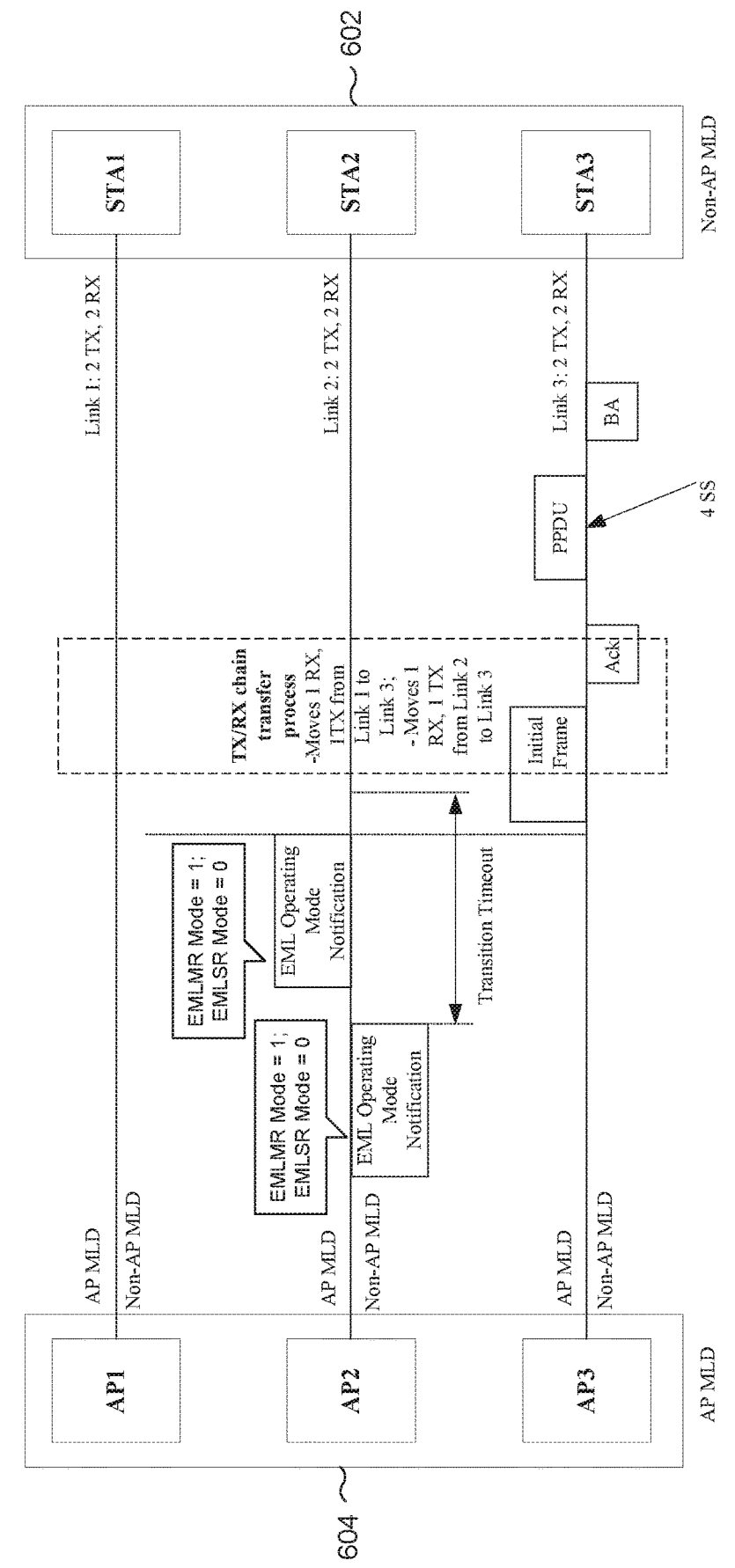
FIG. 6 illustrates an example of a procedure for EMLMR mode of operation according to embodiments of this disclosure.

FIG. 6 illustrates an example of a procedure 600 for EMLMR mode of operation according to embodiments of this disclosure. The embodiment of the example procedure 600 for EMLMR mode of operation shown in FIG. 6 is for illustration only. Other embodiments of the example procedure 600 for EMLMR mode of operation could be used without departing from the scope of this disclosure.

As illustrated in FIG. 6, the AP MLD 604 has three affiliated APs: AP1 operating on 2.4 GHz band, AP2 operating on 5 GHz band, and AP3 operating on 6 GHz band. The non-AP MLD 602 has three affiliated STAs: STA1 operating on 2.4 GHz band, STA2 operating on 5 GHz band, and STA3 operating on 6 GHz band. Three links are established between the AP MLD 604 and the non-AP MLD 602: Link 1 between AP1 and STA1, Link 2 between AP2 and STA2, and Link 3 between AP3 and STA3. The non-AP MLD 602 is a multi-radio non-AP MLD, where STA1, STA2, and STA3 each has two transmit chains and two receive chain. Both the AP MLD 604 and the non-AP MLD 602 support the EMLMR mode of operation. The non-AP AP MLD 602 lists all three links, Link 1, Link 2, and Link 3, as the EMLMR links. In the Basic Multi-Link element exchanged between the AP MLD 604 and the non-AP MLD 602, the EML Capabilities Present subfield is set to 1, and both the EMLMR Rx NSS and EMLME Tx NSS subfields in the EML Capabilities subfield is set to the value of 4. At one point of time of operation, the non-AP MLD 602 intends to enter into EMLMR mode and sends an EML Operating Mode Notification frame to the AP MLD 604 on Link 2. In that EML Operating Mode Notification frame, the EMLMR Mode subfield in the EML Control field is set to 1 and the EMLSR Mode subfield in the EML Control field is set to 0. Upon receiving the EML Operating Mode Notification frame on Link 2, AP2 affiliated with the AP MLD 604 sends, in response, another EML Operating Mode Notification frame to the non-AP MLD 602 on Link 2 and sets the EMLMR Mode subfield in the EML Control field to 1 and the EMLSR Mode subfield in the EML Control field to 0 in the EML Operating Mode Notification frame. Upon receiving the EML Operating Mode Notification frame from the AP MLD 604, which is transmitted before the timeout timer indicated in the Transition Timeout subfield in the EML Capabilities subfield in the Basic Multi-Link element expires, the non-AP MLD 602 transitions into EMLMR mode. After the non-AP MLD 602 transitions into EMLMR mode, the AP MLD 604 sends the initial frame on Link 3 to initiate the frame exchanges for EMLMR operation. Upon receiving the initial frame on Link 3, the non-AP MLD 602—

> Transfers 1 transmit chain and 1 receive chain from Link 1 to Link 3
> Transfers 1 transmit chain and 1 receive chain from Link 2 to Link 3.

After the transmit and receive chain transfer process is complete, Link 3 now has 4 transmit chains and 4 receive chains. Therefore, STA3 affiliated with the non-AP MLD 602 can now perform transmit and receive operation using 4 spatial streams on Link 3, in accordance with the value set in the EMLMR Rx NSS and EMLMR Tx NSS subfields in the EML Capabilities subfield of the Basic Multi-link element. STA 3 affiliated with the non-AP MLD 602 then sends an Ack frame in response to the initial control frame sent by the AP MLD 604. Accordingly, the AP MLD 604 performs subsequent PPDU transmission to the non-AP MLD 602 on Link 3 using 4 spatial streams. After the EMLMR frame exchange sequence, STAs affiliated with the non-AP MLD 602 are able to perform based on per-link spatial stream capability.

Figure 7:
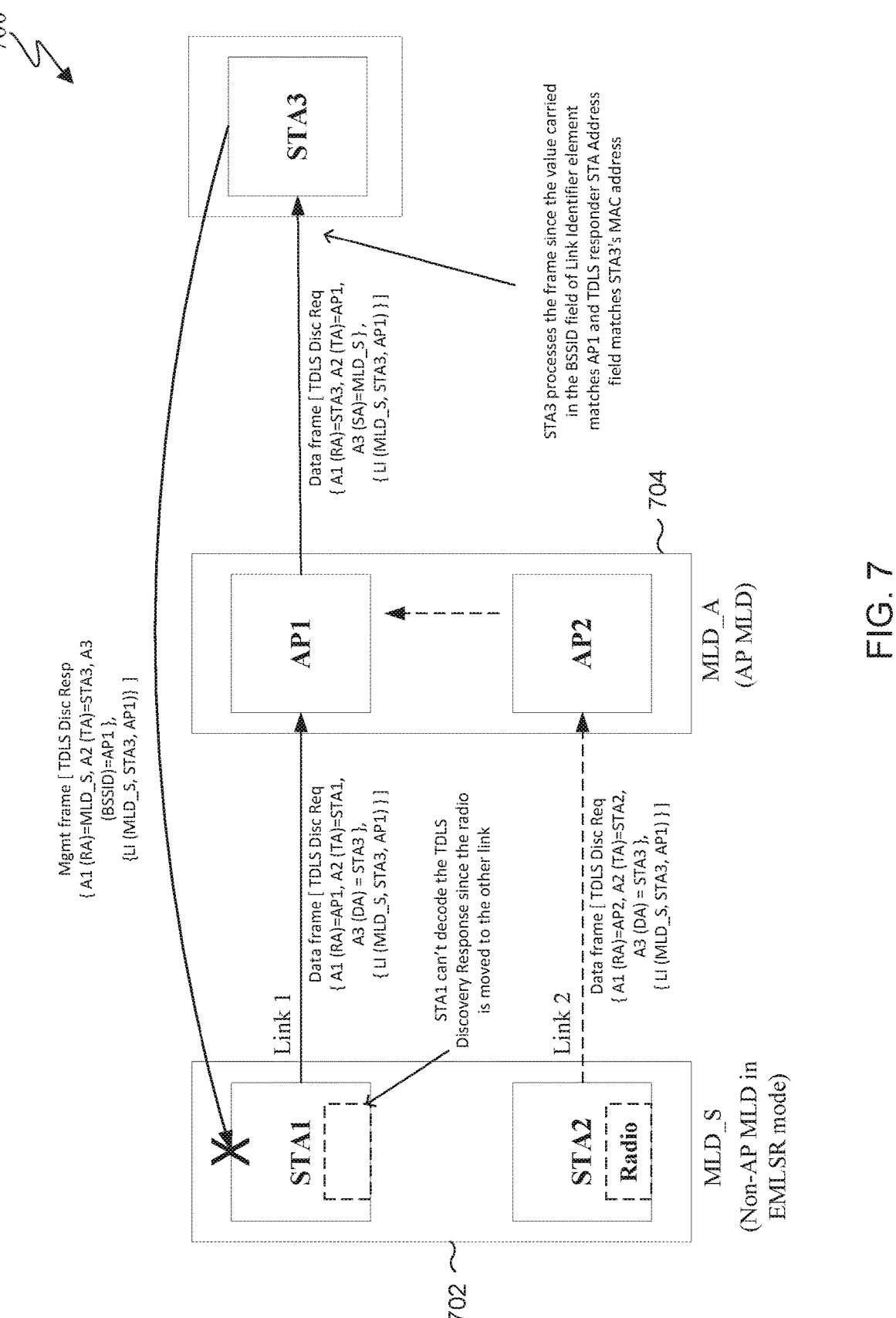
FIG. 7 illustrates an example where the non-AP MLD cannot process a TDLS discovery response frame according to embodiments of the present disclosure.

FIG. 7 illustrates an example 700 where the non-AP MLD cannot process a TDLS discovery response frame according to embodiments of the present disclosure. The embodiment of the example 700 where the non-AP MLD cannot process a TDLS discovery response frame shown in FIG. 7 is for illustration only. Other embodiments of the example 700 where the non-AP MLD cannot process a TDLS discovery response frame could be used without departing from the scope of this disclosure.

As illustrated in FIG. 7, when the MLD in the EMLSR mode (or a single radio non-AP MLD) is the TDLS initiator and a TDLS responding device is a legacy device, the TDLS discovery response can be sent over a link, but the EMLSR device may not be operating on that link when the response frame is sent by the TDLS responder (the EMLSR device at that time may have the radio on another link). Note that the response frame is not sent through the AP MLD 704. The non-AP MLD 702 doesn't know on which link STA3 would be sending the response frame. STA3 can send the response on Link-1 but due to EMLSR operation the radio might have already moved to another link (Link 2 in the figure).

Accordingly, the non-AP MLD 702 can't process the discovery response frame. The same situation can also happen even when the TDLS responder operates on both links as illustrated in FIG. 8.

Figure 8:
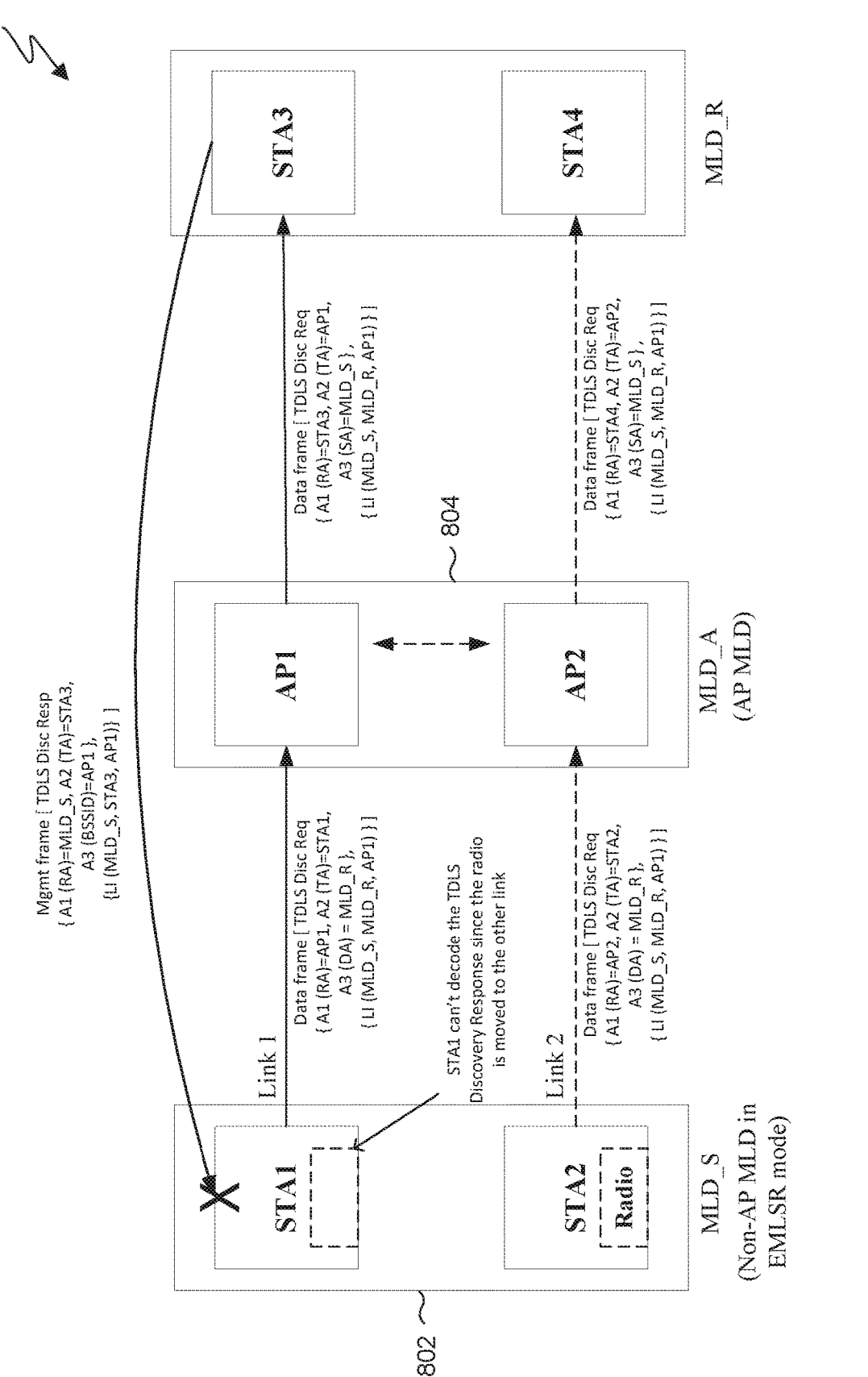
FIG. 8 illustrates an example where the MLD_S cannot process a TDLS discover response frame according to embodiments of the present disclosure.

FIG. 8 illustrates an example 800 where the MLD_S cannot process a TDLS discovery response frame according to embodiments of the present disclosure. The embodiment of the example 800 where the MLD_S cannot process a TDLS discovery response frame shown in FIG. 8 is for illustration only. Other embodiments of the example 800 where the MLD_S cannot process a TDLS discovery response frame could be used without departing from the scope of this disclosure.

As illustrated in FIG. 8, when the MLD_S 802 in the EMLSR mode is the TDLS initiator and a TDLS responding device is a legacy device, the TDLS discovery response can be sent over a link, but the EMLSR device may not be operating on that link when the response frame is sent by the TDLS responder (the EMLSR device at that time may have the radio on another link). Note that the response frame is not sent through the AP MLD 804. The non-AP MLD 802 doesn't know on which link STA3 or STA 4 would be sending the response frame. STA3 can send the response on Link 1—but due to EMLSR operation the radio might have already moved to another link (Link 2 in the figure). STA4 can send the response on Link 2—but due to EMLSR operation the radio might have already moved to another link (Link 1 in the figure). Accordingly, the non-AP MLD 802 can't process the discovery response frame because it has already moved the radio to another link due to EMLSR operation.

If the non-AP MLD is the TDLS initiator and if all the TDLS Discovery Request frames are sent on one link (for example, the first link) for discovering TDLS peer STAs on different links, it is possible that the TDLS peer STA that is a TDLS responder may send the TDLS Discovery Response frame on a second link. However, due to the EMLSR operation, it is possible that the non-AP MLD does not have the radio left on the second link. Hence, the non-AP MLD may not be able to receive the TDLS Discovery Response frame and hence cannot discover the responder TDLS peer STA.

Figure 9:
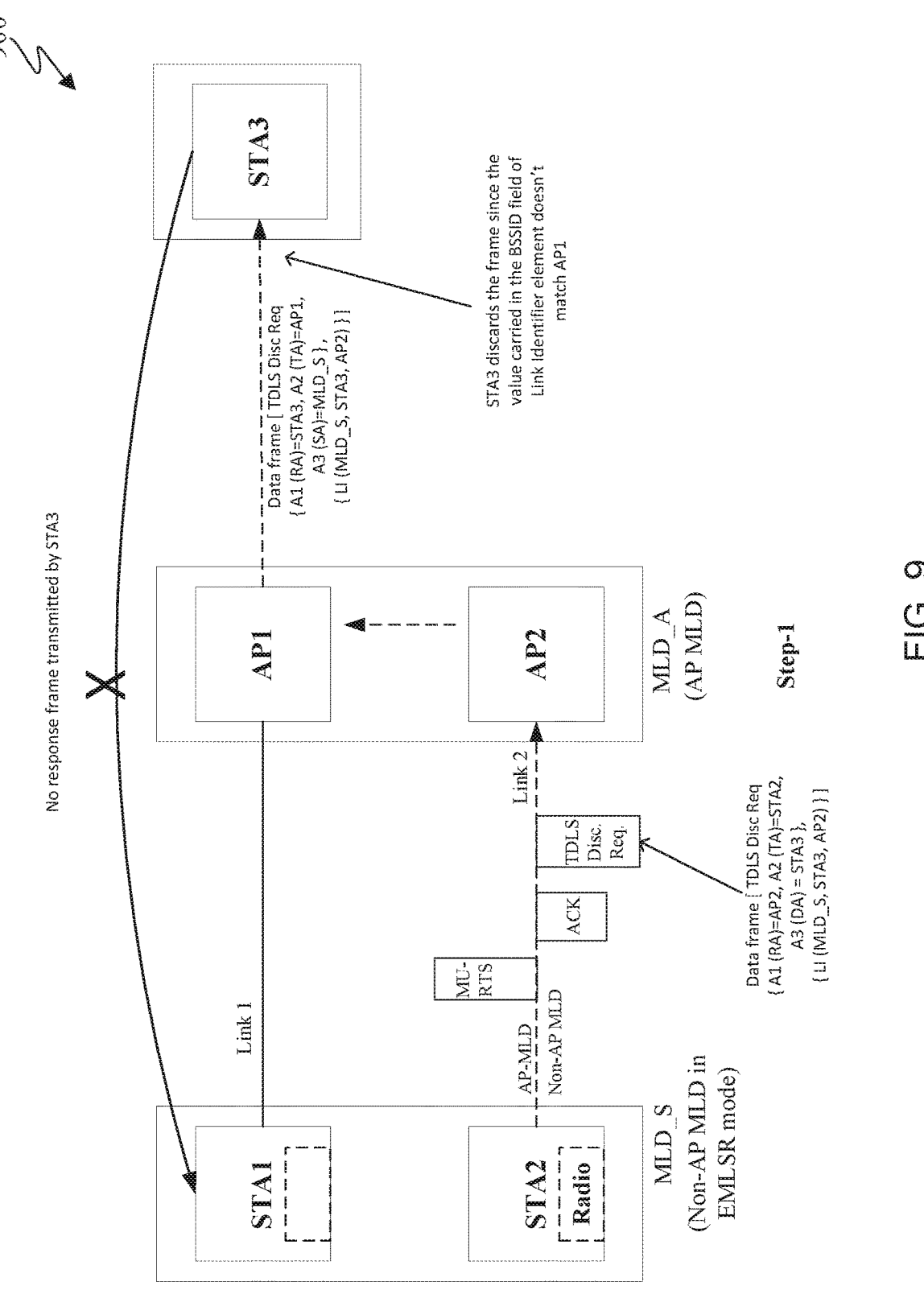
FIG. 9 illustrates an example of the non-AP MLD sending the TDLS discovery request frame on link 2 for discovering TDLS peer STAs on link 2 according to embodiments of the present disclosure.

FIG. 9 illustrates an example 900 of the non-AP MLD sending the TDLS discovery request frame on link 2 for discovering TDLS peer STAs on link 2 according to embodiments of the present disclosure. The embodiment of the example 900 of the non-AP MLD sending the TDLS discovery request frame on link 2 for discovering TDLS peer STAs on link 2 shown in FIG. 9 is for illustration only. Other embodiments of the example 900 of the non-AP MLD sending the TDLS discovery request frame on link 2 for discovering TDLS peer STAs on link 2 could be used without departing from the scope of this disclosure.

Figure 10:
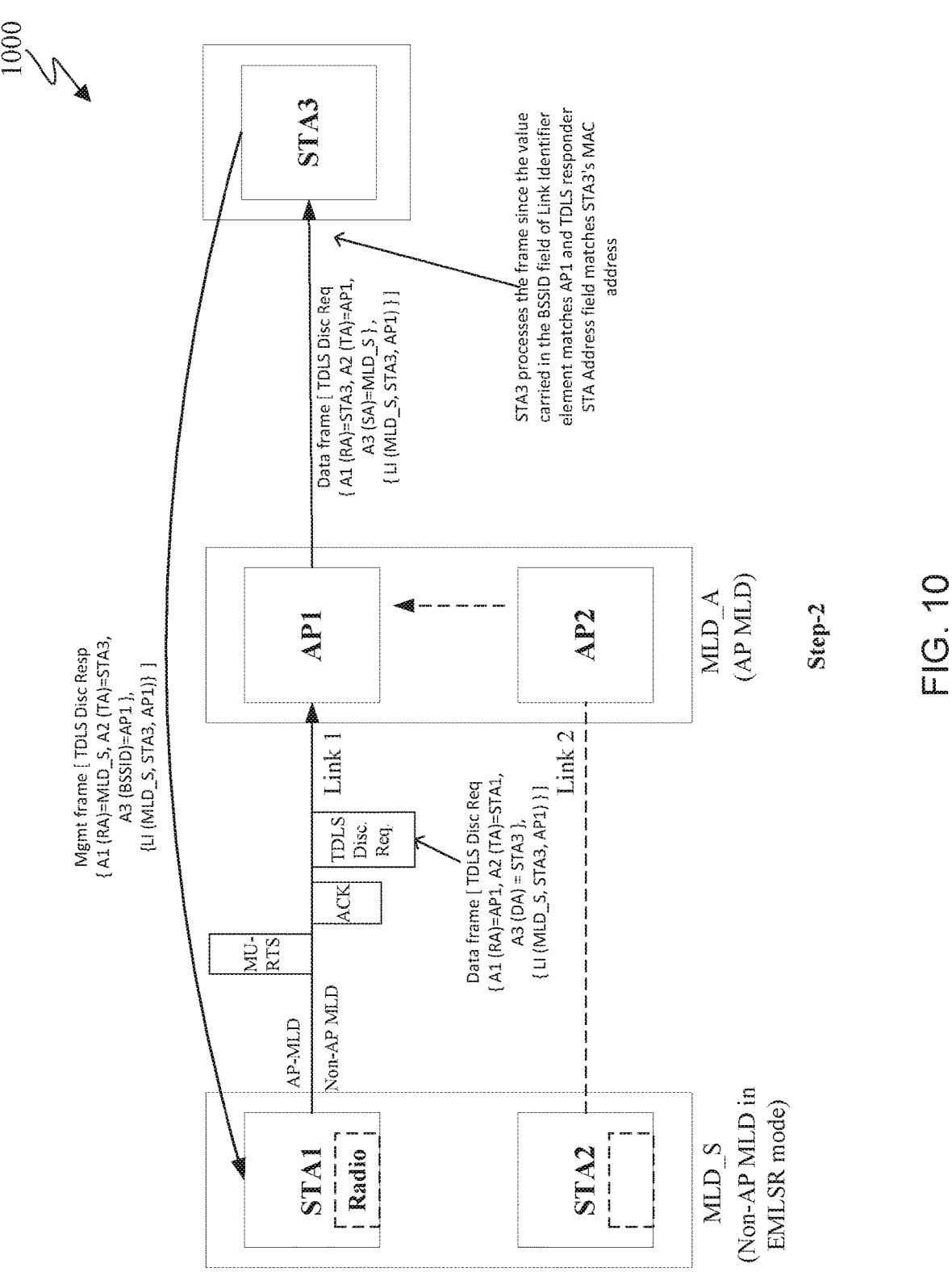
FIG. 10 illustrates an example of the non-AP MLD sending a second TDLS discovery request frame on link 1 for discovering TDLS peer STAs on link 1 according to embodiments of the present disclosure.

FIG. 10 illustrates an example 1000 of the non-AP MLD sending a second TDLS discovery request frame on link 1 for discovering TDLS peer STAs on link 1 according to embodiments of the present disclosure. The embodiment of the example 1000 of the non-AP MLD sending the TDLS discovery request frame on link 1 for discovering TDLS peer STAs on link 1 shown in FIG. 10 is for illustration only. Other embodiments of the example 1000 of the non-AP MLD sending the TDLS discovery request frame on link 1 for discovering TDLS peer STAs on link 1 could be used without departing from the scope of this disclosure.

According to one embodiment, when a non-AP MLD intends to discover a TDLS peer STA on any of its link and if the non-AP MLD is operating in the EMLSR mode, then the non-AP MLD may send the TDLS Discovery Request frames on different links separately—each TDLS Discovery Request frame can be for discovering TDLS peer STAs on which the TDLS Discovery Request frame is sent. FIG. 9 and FIG. 10 illustrate this embodiment.

Figure 11:
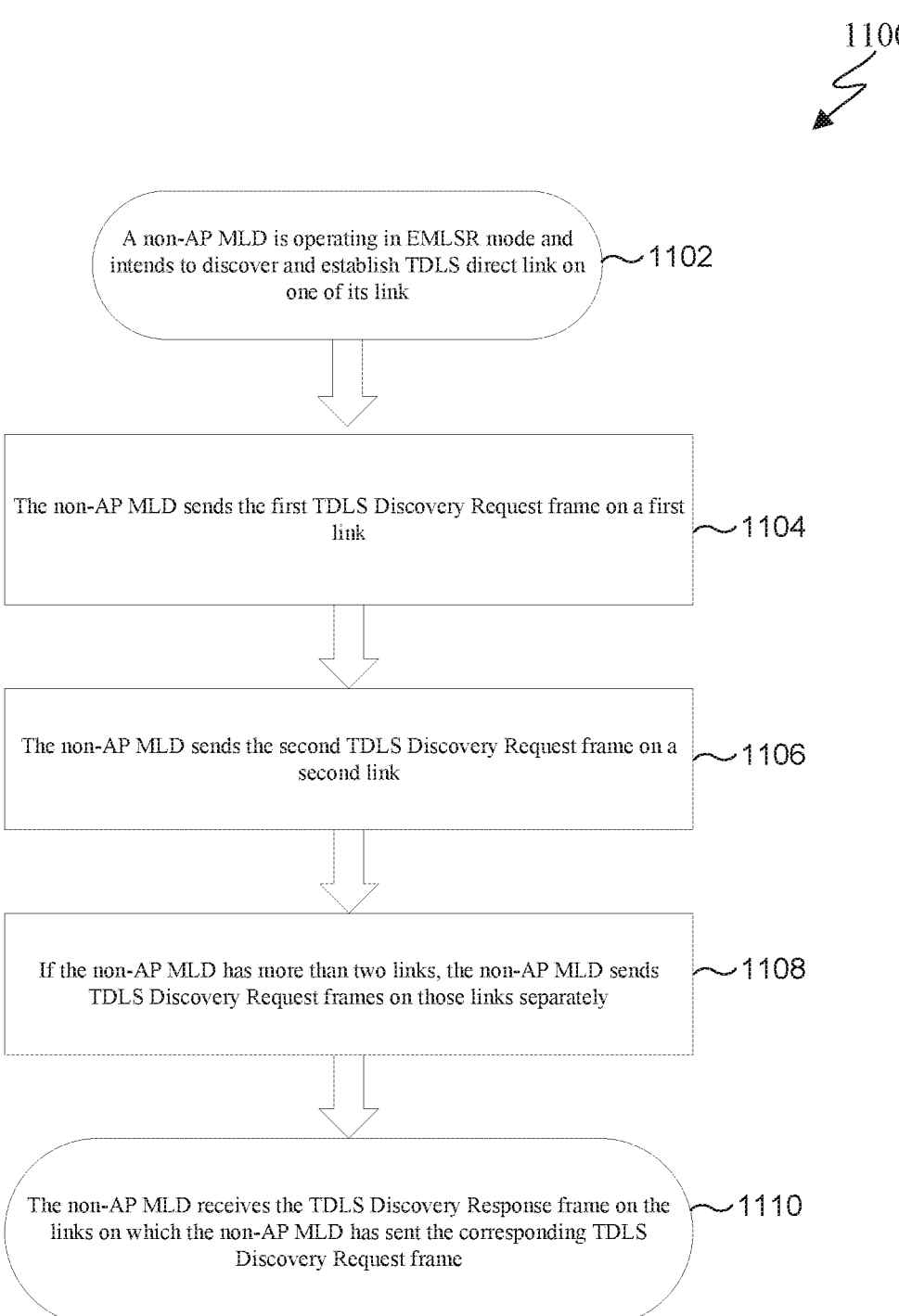
FIG. 11 illustrates a flowchart of a method for TDLS discovery for the EMLSR mode of operation according to embodiments of the present disclosure.

FIG. 11 illustrates a flowchart of a method 1100 performed by a non-AP MLD for TDLS discovery for the EMLSR mode of operation according to embodiments of the present disclosure. The embodiment of the example method 1100 for TDLS discovery for the EMLSR mode of operation shown in FIG. 11 is for illustration only. Other embodiments of the example method 1100 for TDLS discovery for the EMLSR mode of operation could be used without departing from the scope of this disclosure.

As illustrated in FIG. 11, the method 1100 begins at step 1102, where a non-AP-MLD is operating in the EMLSR mode and intends to discover and establish a TDLS direct link on one of its links. At step 1104, the non-AP MLD sends the first TDLS Discovery Request frame on a first link. At step 1106, the non-AP MLD sends the second TDLS Discovery Request frame on a second link. At step 1108, if the non-AP MLD has more than two links, the non-AP MLD sends TDLS Discovery Request frames on those links separately. At step 1110, the non-AP MLD receives the TDLS Discovery Response frame on the links on which the non-AP MLD has sent the corresponding TDLS Discovery Request frame.

According to one embodiment, once the AP MLD receives the TDLS Discovery Request frame from the non-AP MLD as an indication of the triggering of the TDLS discovery process, if the non-AP MLD is in the EMLSR mode, the AP MLD then can send the EMLSR initial control frame to the other links to facilitate the non-AP MLD sending the TDLS Discovery Request frame on the other link and be able to discover the TDLS peer STAs on the other links.

According to another embodiment, a non-AP MLD that is operating in the EMLSR mode that intends to discover TDLS peer STAs may disable the EMLSR mode. The non-AP MLD can subsequently send separate TDLS Discovery Request frames on separate links to discover TDLS peer STAs on those separate links.

Figure 12:
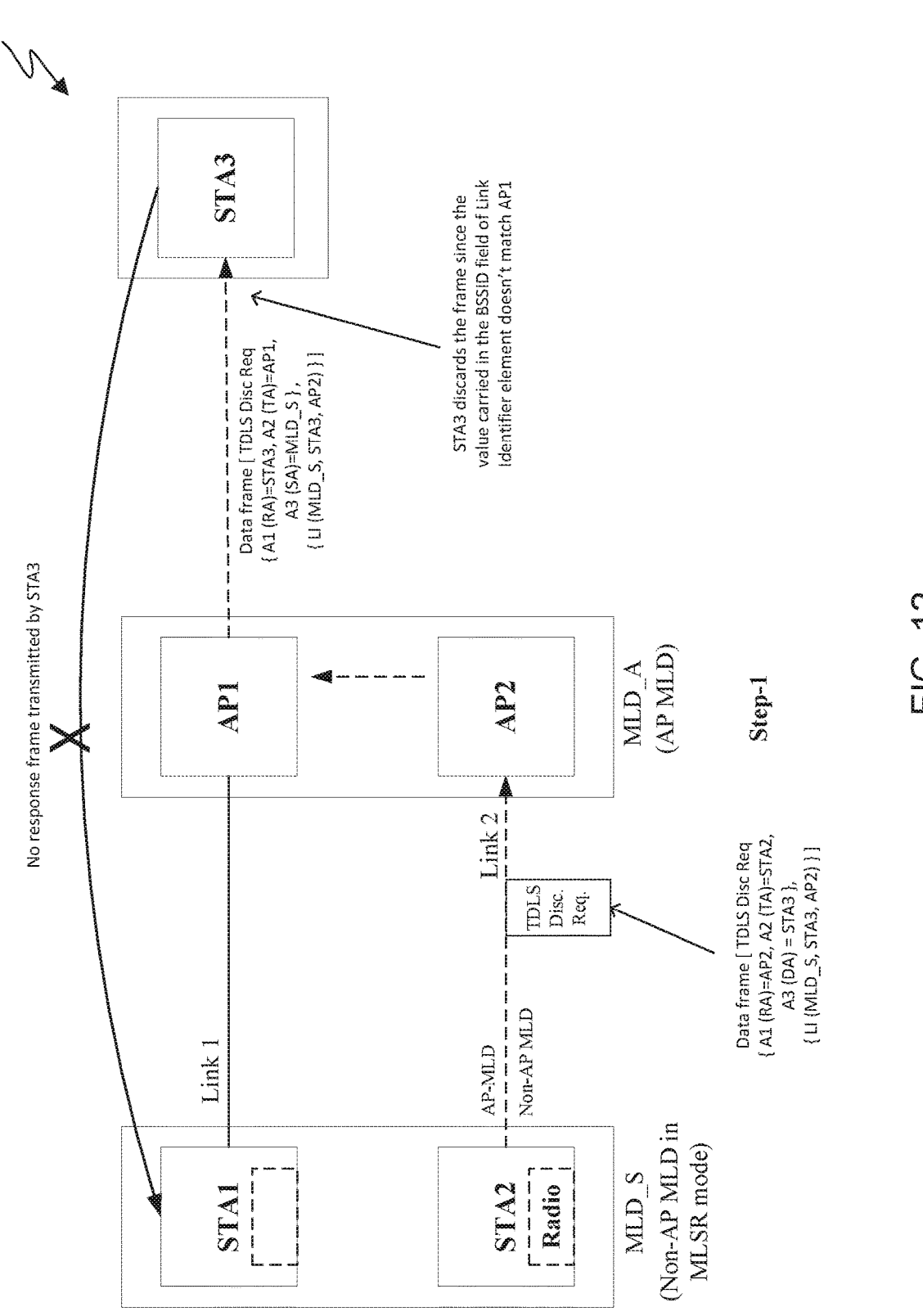
FIG. 12 illustrates an example of discovering link 2 for an MLSR device according to embodiments of the present disclosure.
Figure 13:
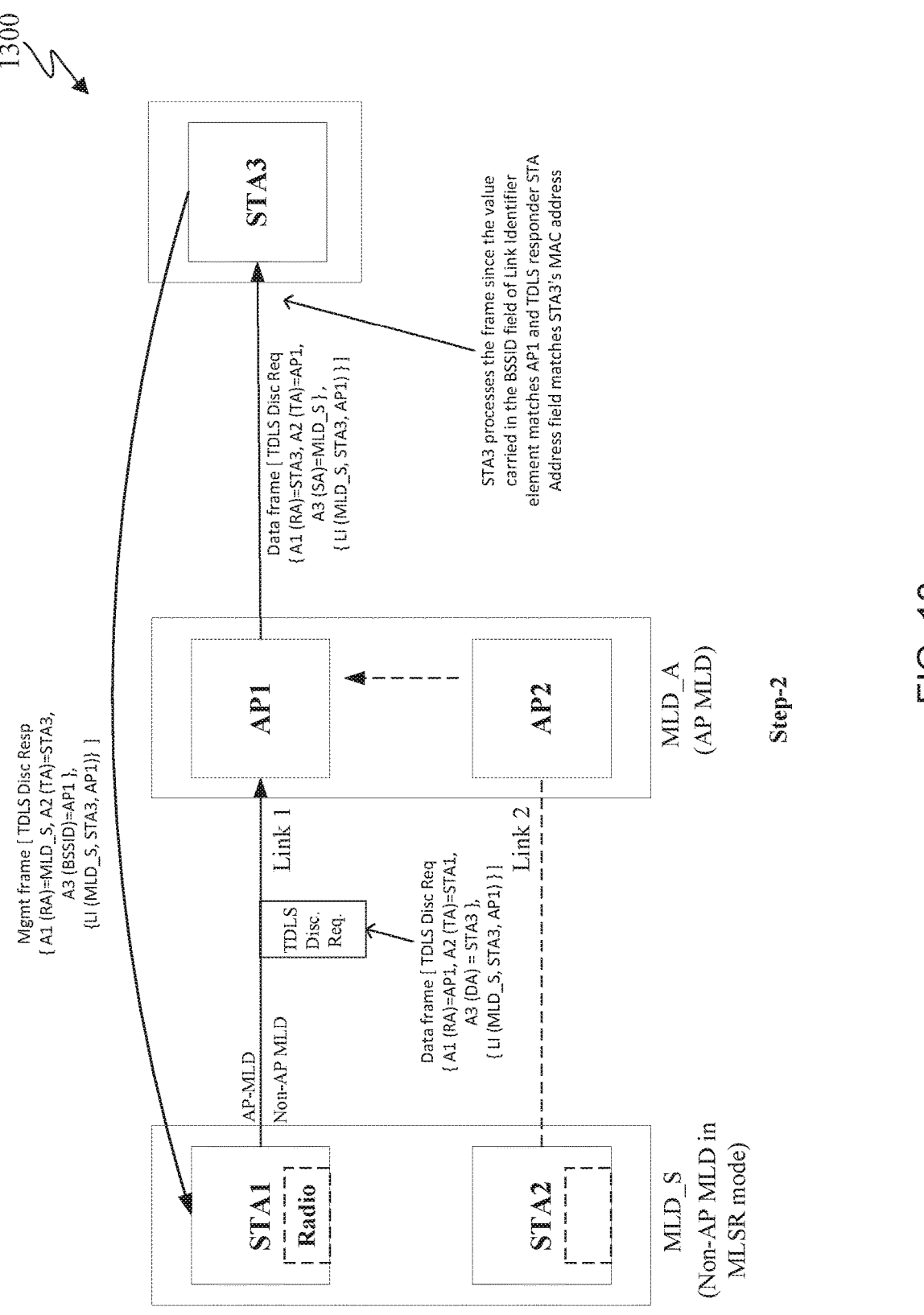
FIG. 13 illustrates an example of discovering link 1 for an MLSR device according to embodiments of the present disclosure.

According to one embodiment, when a non-AP MLD intends to discover a TDLS peer STA on any of its link and if the non-AP MLD is operating in the MLSR mode, then the non-AP MLD may send the TDLS Discovery Request frames on different links separately—each TDLS Discovery Request frame can be for discovering TDLS peer STAs on which the TDLS Discovery Request frame is sent. FIG. 12 and FIG. 13 illustrate this embodiment.

FIG. 12 illustrates an example 1200 of discovering link 2 for an MLSR device according to embodiments of the present disclosure. The embodiment of the example 1200 of discovering link 2 for an MLSR device shown in FIG. 12 is for illustration only. Other embodiments of the example 1200 of discovering link 2 for an MLSR device could be used without departing from the scope of this disclosure.

FIG. 13 illustrates an example 1300 of discovering link 1 for an MLSR device according to embodiments of the present disclosure. The embodiment of the example 1300 of discovering link 1 for an MLSR device shown in FIG. 13 is for illustration only. Other embodiments of the example 1300 of discovering link 1 for an MLSR device could be used without departing from the scope of this disclosure.

As illustrated in FIGS. 12 and 13, according to one embodiment, a non-AP MLD that is an MLSR non-AP MLD that intends to discover TDLS peer STAs can subsequently send separate TDLS Discovery Request frames on separate links to discover TDLS peer STAs on those separate links.

According to one embodiment, upon receiving the first TDLS Discovery Request frame from a non-AP MLD in EMLSR mode on a first link, the AP MLD waits for a threshold amount of time before the AP MLD sends the EMLSR initial control frame on a second link (for example, to enable the non-AP MLD to discover TDLS peer STA on the second link).

According to one embodiment, once the AP MLD receives the TDLS Discovery Request frame on a link (for example, first link), the AP MLD ensures that it does not initiate a long frame exchange sequence on that link so that the non-AP MLD gets a chance to send the second request frame on the second link. According to another embodiment, if the AP MLD sends another MU-RTS on the second link there can be a timer that can start after receiving the first request frame by the AP MLD. At the expiration of the timer, the AP MLD may send the second MU-RTS on the second link.

Figure 14:
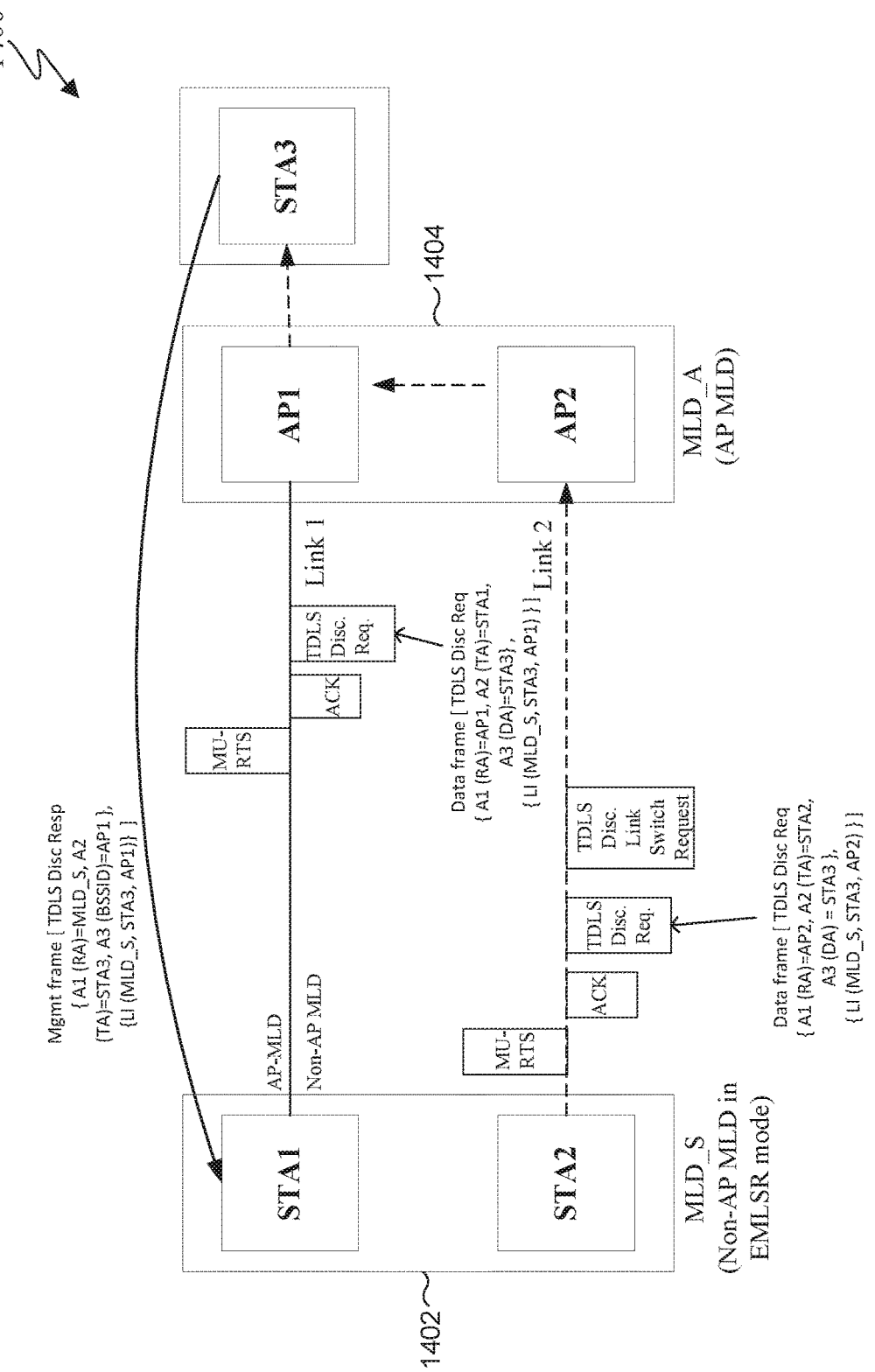
FIG. 14 illustrates an example of enabling discovery of TDLS peer STAs on a second link according to embodiments of the present disclosure.

FIG. 14 illustrates an example 1400 of enabling discovery of TDLS peer STAs on a second link according to embodiments of the present disclosure. The embodiment of the example 1400 of enabling discovery of TDLS peer STAs on a second link shown in FIG. 14 is for illustration only. Other embodiments of the example 1400 of enabling discovery of TDLS peer STAs on a second link could be used without departing from the scope of this disclosure.

According to one embodiment, after sending the first TDLS discovery request frame on a first link, the non-AP 1402 can send a notification message to the AP MLD 1404 to switch the EMLSR link to another link. For example, the non-AP MLD 1402 might not have received any TDLS discovery response frame on the first link and may want to try out the second link. The notification message acts as a request to the AP MLD 1404 to switch the EMLSR link to a second link. According to one embodiment, the AP MLD 1404 may continue any remaining frame exchange on the second link. On the second link, the non-AP MLD 1402 can send the second TDLS Discovery request frame to discover TDLS peer STAs on the second link. FIG. 14 illustrates this embodiment where a TDLS Discovery Link Switch Request frame is used for the notification message.

FIG. 15 illustrates a flowchart of a method 1500 for wireless communication performed by a non-AP device according to embodiments of the present disclosure. The embodiment of the example method 1500 shown in FIG. 15 is for illustration only. Other embodiments of the example method 1500 could be used without departing from the scope of this disclosure.

As illustrated in FIG. 15, the method 1500 begins at step 1502, where the non-AP MLD forms links with corresponding APs of an AP MLD, wherein at least a subset of the links are enhanced multi-link single-radio (EMLSR) links configured to operate in an EMLSR mode of operation. At step 1504, the non-AP MLD generates a first message including a tunneled direct link setup (TDLS) discovery request on the links separately for discovery of a peer STA on a corresponding link on which a message containing the TDLS discovery request is sent. At step 1506. The non-AP MLD transmits the first message. At step 1508, the non-AP MLD receives a TDLS discovery response message indicating discovery of the peer STA on the link on which the message containing the TDLS discovery request was sent.

In one embodiment, the non-AP MLD is in the EMLSR mode of operation.

In one embodiment, the non-AP MLD receives an indication associated with an EMLSR control message; generates, based on the indication, a second message including the TDLS discovery request on a second link of the links on which the EMLSR control message is received; and transmits the second message.

In one embodiment, the non-AP MLD disables the EMLSR mode of operation; generates separate TDLS discovery requests on separate links for discovering one or more TDLS peer STAs on one or more of the separate links; and transmits the separate TDLS discovery requests.

In one embodiment, the non-AP MLD receives an indication associated with a second EMLSR control message on a second link of the links after a threshold amount of time has elapsed since the reception of a first EMLSR control message on a first link of the links; generates, based on the indication, a second message including the TDLS discovery request on the second link of the links; and transmits the second message.

In one embodiment, the non-AP MLD receives a first multi user request to send (MU-RTS) message from the AP MLD on a first link of the links to enable discovery of TDLS peer STAs on a first link of the links; and after a threshold amount of time has elapsed, receives a second MU-RTS message from the AP MLD on a second link of the links to enable discovery of TDLS peer STAs on a second link of the links.

In one embodiment, the non-AP MLD generates a notification message to switch the EMLSR mode of operation to a second link of the links; and transmits the notification message.

In one embodiment, the non-AP MLD generates a second message including the TDLS discovery request on the second link of the links for discovery of a peer STA on the second link; and transmits the second message.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:

stations (STAs), each comprising a transceiver configured to form a link with a corresponding AP of an AP MLD, wherein at least a subset of links are enhanced multi-link single-radio (EMLSR) links configured to operate in an EMLSR mode of operation; and a processor operably coupled to the STAs, the processor configured to:

generate a first message including a tunneled direct link setup (TDLS) discovery request on the links separately for discovery of a peer STA on a corresponding link on which a message containing the TDLS discovery request is sent;

receive an indication associated with a second EMLSR control message on a second link of the links after a threshold amount of time has elapsed since reception of a first EMLSR control message on a first link of the links, and generate, based on the indication, a second message including the TDLS discovery request on the second link of the links;

wherein at least one of the transceivers is configured to:

transmit, to the AP MLD, the first message on the first link of the links, transmit, to the AP MLD, the second message on the second link of the links, and receive a TDLS discovery response message indicating discovery of the peer STA on the link on which the message containing the TDLS discovery request was sent, wherein the non-AP MLD is in the EMLSR mode of operation.

2. The non-AP MLD of claim 1, wherein:

the processor is configured to:

disable the EMLSR mode of operation, and generate separate TDLS discovery requests on separate links for discovering one or more TDLS peer STAs on one or more of the separate links; and the at least one transceiver is configured to transmit the separate TDLS discovery requests on the separate links.

3. The non-AP MLD of claim 1, wherein the at least one transceiver is configured to:

receive a first multi user request to send (MU-RTS) message from the AP MLD on the first link of the links to enable discovery of TDLS peer STAs on the first link of the links; and after a threshold amount of time has elapsed, receive a second MU-RTS message from the AP MLD on the second link of the links to enable discovery of TDLS peer STAs on the second link of the links.

4. The non-AP MLD of claim 1, wherein:

the processor is configured to generate a notification message to switch the EMLSR mode of operation to the second link of the links; and the at least one transceiver is configured to transmit the notification message.

5. An access point (AP) multi-link device (MLD) comprising:

APs, each comprising a transceiver configured to form a link with a corresponding station (STA) of a non-AP MLD, wherein at least a subset of links are enhanced multi-link single-radio (EMLSR) links configured to operate in an EMLSR mode of operation, wherein at least one of the transceivers is configured to:

receive, from the STA, a first message including a tunneled direct link setup (TDLS) discovery request on the links separately for discovery of a peer STA on a link on which the TDLS discovery request is sent, and transmit an EMLSR control message to a second link of the links to facilitate the non-AP MLD sending the TDLS discovery request on the second link; and a processor operably coupled to the APs, the processor configured to generate the EMLSR control message based on the TDLS discovery request.

6. The AP MLD of claim 5, wherein the processor is configured to determine that the non-AP MLD is in the EMLSR mode of operation.

7. The AP MLD of claim 6, wherein the at least one transceiver is configured to receive, based on the EMLSR control message, a second message including the TDLS discovery request on a second link of the links on which the EMLSR control message is received.

8. The AP MLD of claim 6, wherein the at least one transceiver is configured to:

transmit a first multi user request to send (MU-RTS) message on a first link of the links to enable discovery of TDLS peer STAs on a first link of the links; and after a threshold amount of time has elapsed, transmit a second MU-RTS message on a second link of the links to enable discovery of TDLS peer STAs on a second link of the links.

9. A method for wireless communication performed by a non-access point (AP) multi-link device (MLD) that comprises stations (STAs), the method comprising:

forming links with corresponding APs of an AP MLD, wherein at least a subset of the links are enhanced multi-link single-radio (EMLSR) links configured to operate in an EMLSR mode of operation;

generating a first message including a tunneled direct link setup (TDLS) discovery request on the links separately for discovery of a peer STA on a corresponding link on which a message containing the TDLS discovery request is sent;

receiving an indication associated with a second EMLSR control message on a second link of the links after a threshold amount of time has elapsed since reception of a first EMLSR control message on a first link of the links;

generating, based on the indication, a second message including the TDLS discovery request on the second link of the links;

transmitting, to the AP MLD, the first message on the first link of the links:

transmitting, to the AP MLD, the second message on the second link of the links; and receiving a TDLS discovery response message indicating discovery of the peer STA on the link on which the message containing the TDLS discovery request was sent, wherein the non-AP MLD is in the EMLSR mode of operation.

10. The method of claim 9, further comprising:

disabling the EMLSR mode of operation;

generating separate TDLS discovery requests on separate links for discovering one or more TDLS peer STAs on one or more of the separate links; and transmitting the separate TDLS discovery requests on the separate links.

11. The method of claim 9, further comprising:

receiving a first multi user request to send (MU-RTS) message from the AP MLD on the first link of the links to enable discovery of TDLS peer STAs on the first link of the links; and after a threshold amount of time has elapsed, receiving a second MU-RTS message from the AP MLD on the second link of the links to enable discovery of TDLS peer STAs on the second link of the links.

12. The method of claim 9, further comprising:

generating a notification message to switch the EMLSR mode of operation to the second link of the links; and transmitting the notification message.

\* \* \* \* \*